(12) United States Patent
Onuki

(10) Patent No.: US 7,287,869 B2
(45) Date of Patent: Oct. 30, 2007

(54) VEHICLE MIRROR APPARATUS

(75) Inventor: Hiroyasu Onuki, Hiratsuka (JP)

(73) Assignee: Ichikoh Industries, Ltd. (JP)

( * ) Notice: Subject to any disclaimer, the term of this patent is extended or adjusted under 35 U.S.C. 154(b) by 0 days.

(21) Appl. No.: 11/036,710

(22) Filed: Jan. 14, 2005

(65) Prior Publication Data

US 2005/0152053 A1    Jul. 14, 2005

(30) Foreign Application Priority Data

Jan. 14, 2004    (JP) .............................. 2004-007281

(51) Int. Cl.
G02B 7/182    (2006.01)
B60R 1/06    (2006.01)
(52) U.S. Cl. ...................... 359/872; 248/477
(58) Field of Classification Search ................ 359/841, 359/872, 877; 248/477, 478
See application file for complete search history.

(56) References Cited

U.S. PATENT DOCUMENTS

| | | | | |
|---|---|---|---|---|
| 4,197,762 A | * | 4/1980 | Yamana | 74/502.1 |
| 5,005,797 A | * | 4/1991 | Maekawa et al. | 248/479 |
| 5,166,832 A | * | 11/1992 | Zychowicz | 359/841 |
| 5,432,640 A | * | 7/1995 | Gilbert et al. | 359/841 |
| 5,467,222 A | * | 11/1995 | Oishi | 359/841 |
| 5,477,392 A | * | 12/1995 | Mochizuki et al. | 359/841 |
| 5,636,071 A | * | 6/1997 | Mochizuki et al. | 359/877 |
| 5,867,328 A | * | 2/1999 | Stapp et al. | 359/841 |
| 6,022,113 A | * | 2/2000 | Stolpe et al. | 359/841 |
| 6,130,514 A | * | 10/2000 | Oesterholt et al. | 318/438 |
| 6,322,221 B1 | * | 11/2001 | van de Loo | 359/841 |
| 6,371,619 B1 | * | 4/2002 | Assinder et al. | 359/841 |
| 6,634,758 B2 | * | 10/2003 | Preis et al. | 359/842 |
| 6,926,414 B2 | * | 8/2005 | Van Stiphout | 359/841 |

FOREIGN PATENT DOCUMENTS

| | | |
|---|---|---|
| DE | 195 21 432 A1 | 12/1996 |
| EP | 0807551 | * 11/1997 |
| JP | 07-329642 | 12/1995 |

* cited by examiner

*Primary Examiner*—Ricky D. Shafer
(74) *Attorney, Agent, or Firm*—Kilpatrick Stockton LLP

(57) ABSTRACT

A vehicle mirror apparatus includes a stationary side shaft holder which has a shaft (3) and which is provided on a mirror base and a housing (5) which has rotating unit (6) and which can rotate around the shaft (3), the shaft (3) passing through the housing (5). The housing (5) has a shaft holding portion (22) to which a root portion (21) of the shaft (3) is fined, rotation of the housing (5) is supported by sliding the shaft holding portion (22) over the root portion (21) of the shaft (3), one of the shaft holding portion (22) and the root portion (21) of the shaft (3) is formed with projection which project toward the other one of shaft holding portion (22) and the root portion (21) and abut against the other portion.

6 Claims, 5 Drawing Sheets

VEHICLE MIRROR APPARATUS

BACKGROUND OF THE INVENTION

1. Field of the Invention

The present invention relates to an electric vehicle mirror apparatus provided with a rotation driving unit to rotate a housing, and more particularly, to a vehicle mirror apparatus having an improved structure which supports rotation of the housing.

2. Description of the Related Art

A conventional electric vehicle mirror apparatus, one disclosed in Japanese Patent Application Laid-open No. Hei-7-329642 is known. This vehicle mirror apparatus includes a mirror base fixed to a vehicle body, a stationary shaft holder integrally formed on the mirror base, and a housing rotatably mounted on the shaft holder.

The shaft holder is integrally formed with a shaft, and the shaft penetrates the housing so that the housing rotates around the shaft. The housing has a mirror unit including a mirror. The housing accommodates a motor which rotates the housing, and a reduction gear transmitted to an output shaft of the motor. The housing and the mirror unit integrally rotate between a using position and an accommodated position by driving of the motor.

FIGS. 1 and 2 show a structure for supporting the rotation of the housing. In FIG. 1, a reference numeral 100 represents a shaft holder formed on a mirror base (not shown). The shaft holder is integrally formed with a hollow shaft 110. A reference numeral 130 represents the housing which rotates around the shaft 110. A motor and a reduction gear (both not shown) are accommodated in the housing.

A large-diameter is set to be a root portion 120 of the shaft 110, and the root portion 120 is fitted into a shaft holding portion 140 of the housing 130, thereby supporting the rotation of the housing 130. By setting the large-diameter to be the root portion 120, a large contact area between the root portion 120 and the shaft holding portion 140 can be secured, and this makes it possible to stably rotate the housing 130.

FIG. 2 is a plan view of the root portion 120 and the shaft holding portion 100. The shaft holding portion 140 slides over the entire peripheral surface of the root portion 120 having a circular outer surface in a state where the shaft holding portion 140 is in contact with the entire peripheral surface of the root portion 120, thereby supporting the rotation of the housing 130.

According to the conventional rotation supporting structure of the housing 130, since the root portion 120 of the shaft 110 and the shaft holding portion 140 of the housing 130 are in contact with the entire peripheral surface of the root portion 120, the sliding resistance is great. Therefore, there are problem is that it is necessary to increase output which rotates the housing 130, a motor which rotates the housing 130 is increased in size, and it is difficult to reduce the entire vehicle mirror apparatus both in size and weight.

If the diameter of the root portion 120 of the shaft 110 is increased in order to strongly support the rotation of the housing 130, since the sliding resistance caused when the housing rotates becomes great, it is necessary to increase the output which rotates the housing. The conventional technique also has a problem that since the rotation supporting force of the housing 130 and a rotating force are conflicting with each other, it is difficult to adjust these forces.

SUMMARY OF THE INVENTION

The present invention has been achieved in view of the conventional problems, and it is an object of the invention to provide a vehicle mirror apparatus capable of reducing a motor in size, thereby reducing the entire vehicle mirror apparatus in size and weight, and capable of simplifying a design of the apparatus by employing a structure which favorably supports rotation of a housing, without increasing a diameter of a root portion of a shaft more than necessary.

To achieve the above object, a vehicle mirror apparatus according to a first aspect of the present invention includes a stationary side shaft holder which has a shaft and provided on a mirror base, and a housing Which has rotating unit and can rotate around the shaft, the shaft passing through the housing. The housing has a shaft holding portion to which a root portion of the shaft is fitted, rotation of the housing is supported by sliding the shaft holding portion over the root portion of the shaft, one of the shaft holding portion and the root portion of the shaft is formed with projections which project toward the other one of shaft holding portion and the root portion and abut against the other portion.

According to the first aspect, one of the shaft holding portion and the root portion of the shaft is formed with projections which project toward the other one of shaft holding portion and the root portion and abut against the other portion, and the projections slide over the other portion. With this structure, the housing rotates around the shaft in a state where the housing is supported. Since the contact area between the projections and the mating member is small, the sliding resistance becomes small. Therefore, the housing can rotate with small force, and the output of the rotating unit for rotating the housing can be reduced. With this structure, the rotating unit can be reduced in size, and the entire vehicle mirror apparatus can be reduced in size and weight.

Further, since the rotation of the housing is stably supported by the projections, it is unnecessary to increase the diameter of the root portion of the shaft more than necessary. Thus, it is possible to simplify a design for adjusting the rotation support and rotation force of the housing.

A second aspect of the present invention provides the vehicle mirror apparatus according to the first aspect, wherein a tip end of the projections is rounded.

According to the second aspect, since the rounded tip ends of the projections come into contact with the mating member, the sliding resistance with respect to the mating member can further be reduced, and the output for rotating the housing can further be reduced.

A third aspect of the present invention provides the vehicle mirror apparatus according to the first or the second aspect, wherein the projections are formed on at least three locations along a circumferential direction of the shaft.

According to the third aspect, since the projections abut against the mating member at least at three locations in the circumferential direction, the housing can reliably be supported.

A fourth aspect of the present invention provides the vehicle mirror apparatus according to the first or the second aspect, wherein the projections are formed annularly over the entire length in a circumferential direction of the shaft.

According to the fourth aspect, since the projections are formed annularly, the projections can abut against the entire circumference of the mating member. Thus, it is possible not only to support the housing, but also to prevent lubricant such as grease from leaking out from the housing.

According to the first aspect, the projections project toward one of the shaft holding portion and the root portion of the shaft and slidably abut against the one portion. Thus, the sliding resistance is reduced. Accordingly, the output of the rotating unit for rotating the housing can be reduced, and the entire vehicle mirror apparatus can be reducing size and weight. Further, since the rotation of the housing is supported by the projections, it is unnecessary to increase the diameter of the root portion of the shaft more than necessary. Thus, it is possible to simplify a design for adjusting the rotation support and rotation force of the housing.

BRIEF DESCRIPTION OF ACCOMPANYING DRAWINGS

DESCRIPTION OF THE PREFERRED EMBODIMENTS

The present invention will be described in the form of preferred embodiments.

Figure 1:
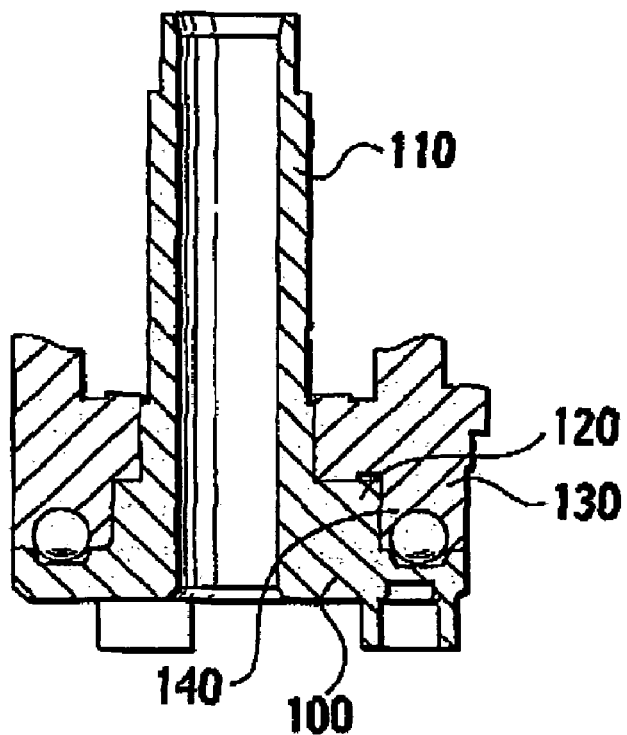
FIG. 1 is a sectional view of a conventional apparatus.
Figure 2:
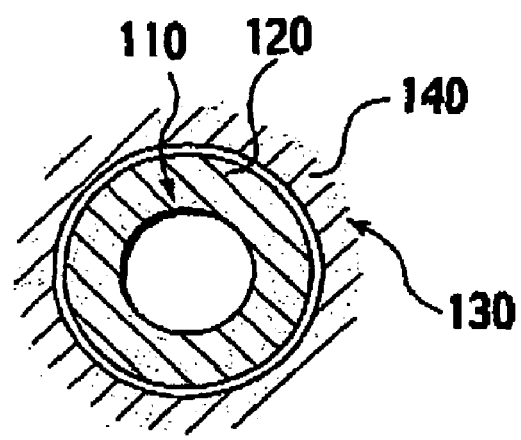
FIG. 2 is a plan sectional view showing a supporting portion of a housing of the conventional apparatus.
Figure 3:
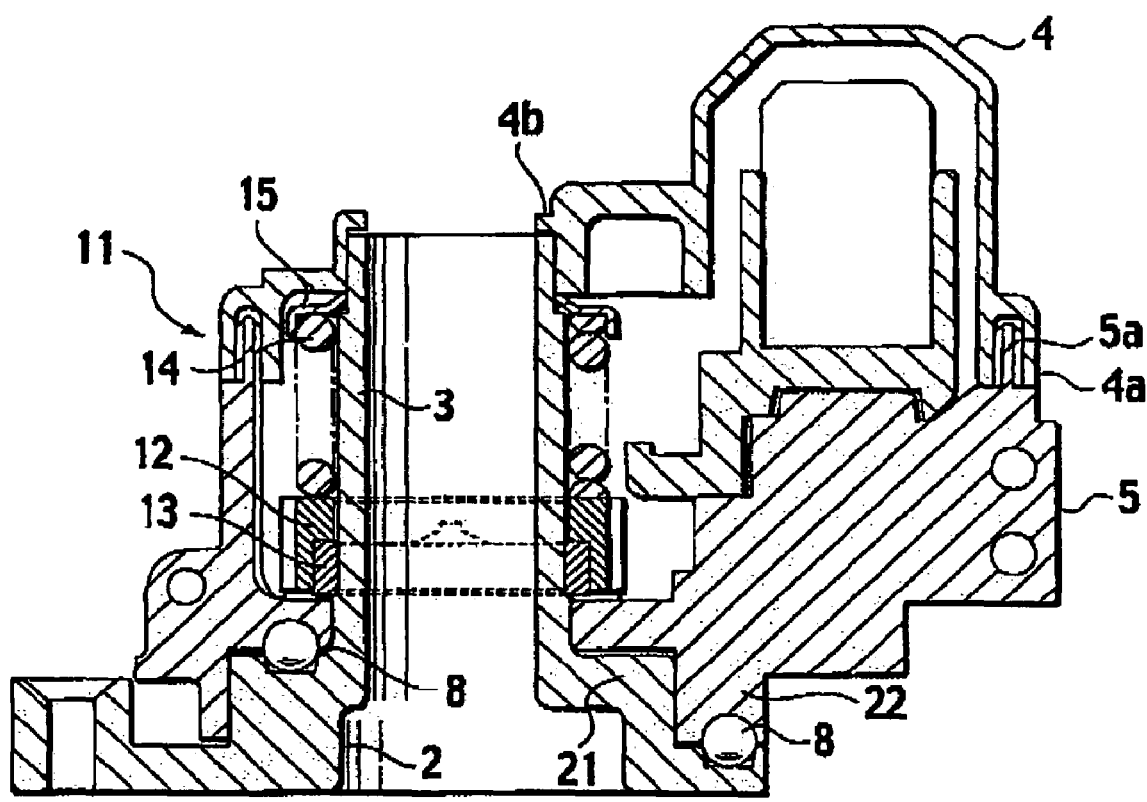
FIG. 3 is a sectional view of an entire vehicle mirror apparatus according to one embodiment of the present invention.
Figure 4:
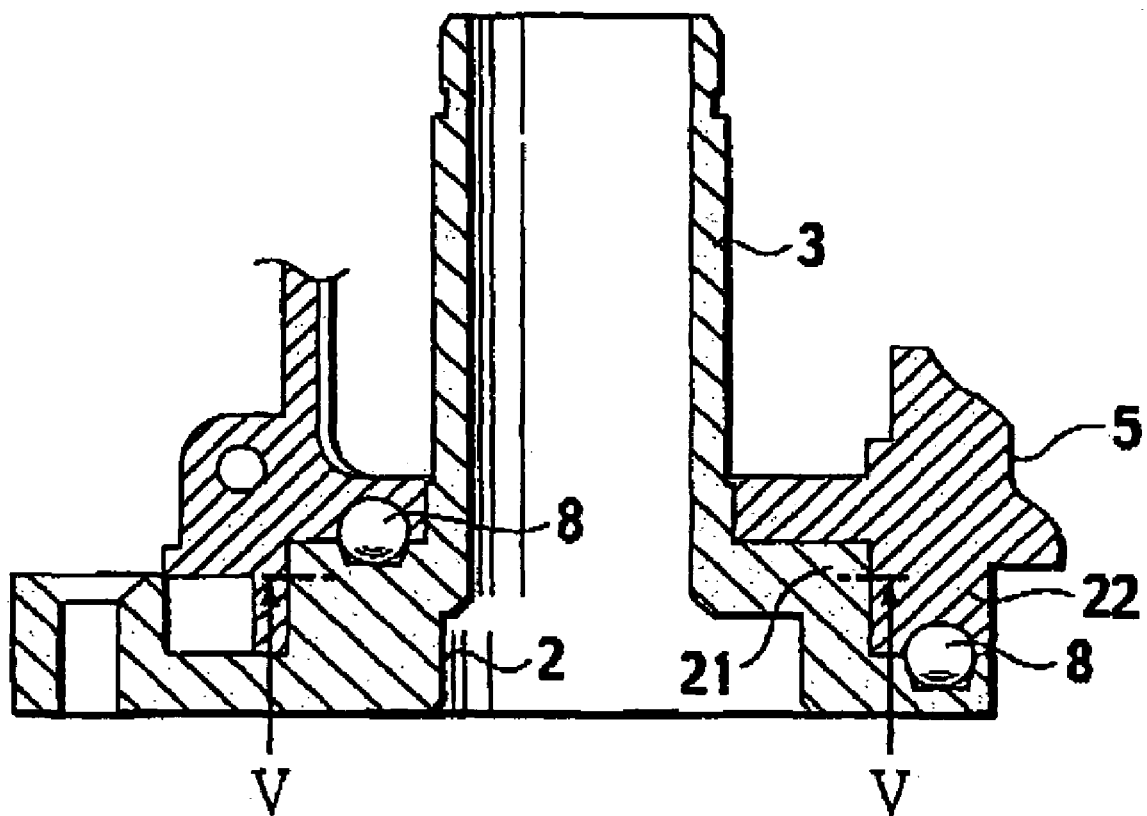
FIG. 4 is a sectional view showing an essential portion of the embodiment.
Figure 5:
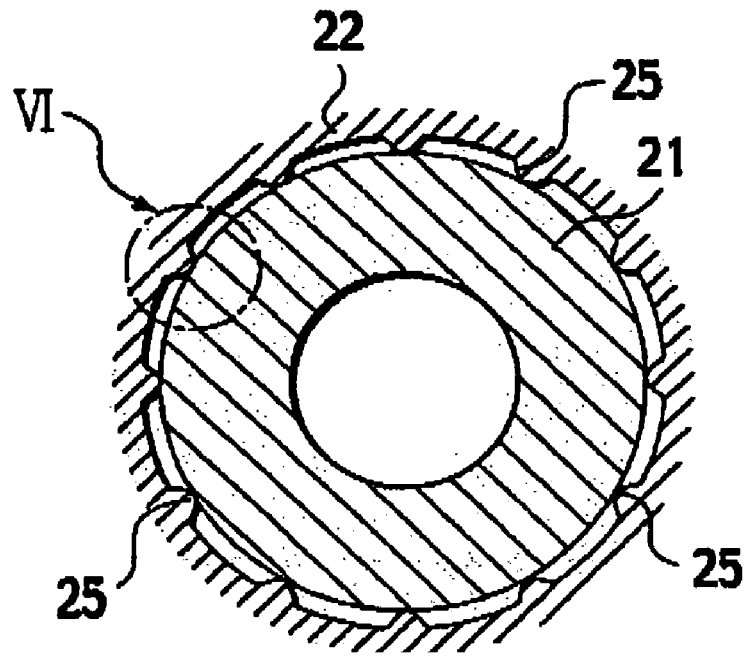
FIG. 5 is a plan sectional view taken along the line V-V in FIG. 4.
Figure 6:
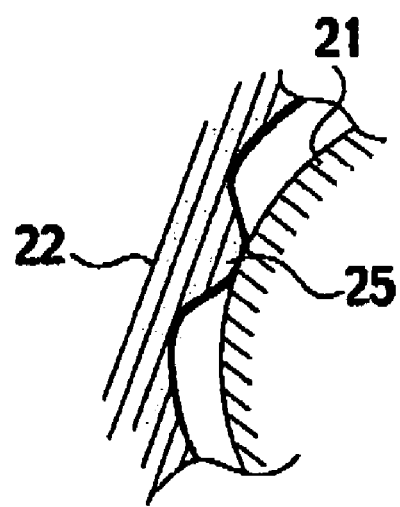
FIG. 6 is an enlarged sectional view of the portion VI in FIG. 5.

FIGS. 3 to 6 show one embodiment of the present invention. FIG. 3 is a sectional view of an entire vehicle mirror apparatus, FIG. 4 is an enlarged sectional view of an essential portion of the apparatus, FIG. 5 is a plan sectional view taken along the line V-V in FIG. 4, and FIG. 6 is a sectional view of the portion VI in FIG. 5 showing shape of a projection.

As shown in FIG. 3, the vehicle mirror apparats of this embodiment has a stationary side shaft holder 2 and a rotatable housing 5.

The shaft holder 2 is accommodated in a mirror base (not shown) fixed to a vehicle body such as a door of an automobile, and the shaft holder 2 is fixed to the mirror base. A shaft 3 integrally projects from the shaft holder 2. The shaft 3 is of hollow so that a harness is inserted into the hollow. The harness supplies electricity to a motor of a rotating unit.

The housing 5 is provided in the mirror base (not shown) having a mirror for checking behind. The housing 5 rotates around the shaft 3 of the shaft holder 2. The mirror base can turn between a using position and an accommodated position by rotating the housing 5.

An upper portion of the housing 5 is opened. The housing 5 is rotated by the motor as the rotating unit and by a reduction gear (not shown). The motor is held by a motor holder which is fixed to an upper portion of the housing 5. The reduction gear is connected to an output shaft of the motor so that the rotation force is transmitted to the housing 5. The rotation of the motor is controlled by a circuit board (not shown) connected to the harness.

The housing 5 is covered with a cover 4, and the housing 5 is tightly closed. The cover 4 is attached to the housing 5 in such a manner that a fitting projection 5a is formed around the housings, and a fitting groove 4a into which the fitting projection 5a is fitted is formed in the cover 4 at a location opposed to the fitting projection 5a. The cover 4 is formed with a flange-like abutting portion 4b at a location opposed to the shaft 3. The abutting portion 4b abuts against an end of the shaft 3. With this structure water can be prevented from entering the cover 4 and the housing 5.

A reference numeral 11 represents a clutch mechanism which functions when the housing 5 (i.e., mirror unit) is manually turned to a forward inclination position. The clutch mechanism 11 includes a clutch gear 12 and a clutch holder 13 constituting a pair of clutch member, a compression coil spring 14, and a ring-like push nut 15. The shaft 3 penetrates these members and with this structure, the clutch mechanism 11 is disposed along an axis of the shaft 3.

The clutch gear 12 can rotate with respect to the shaft 3, and is engaged with the clutch holder 13. The clutch gear 12 and the clutch holder 13 are engaged with each other by a compressive elastic force of the compression coil spring 14. This compressive elastic force is generated by fixing the push nut 15 to the shaft 3 and compressing the compression coil spring 14.

The clutch mechanism 11 is for cutting off the connection between the rotating unit and the housing 5 when any external force caused manually for turning the housing toward the forward inclination position or external force caused by interference with another member. With this clutch mechanism 11, the housing 5 (i.e. mirror unit) can turn toward the foreword inclination position irrespective of the motor and it is possible to prevent the vehicle mirror apparatus from being damaged or broken by external force.

The housing 5 can smoothly rotate around the shaft 3 by disposing balls 8 between the shaft holder 2 and the housing 5.

The rotation of the housing 5 is supported as shown in FIG. 4 in such a manner that a diameter of a root portion 21 of the shaft 3 is increased to a predetermined value the; housing 5 is formed at its lower portion with a shaft holding portion 22 which is opposed to the root portion 21, these members are fitted to each other and in this fitted state, the shaft holding portion 22 is allowed to slide along the root portion 21.

In this embodiment, any one of the root portion 21 and the shaft holding portion 22 of the shaft 3 is formed with projections 25. In the illustrated embodiment as shown in FIGS. 5 and 6, the projections 25 are formed on the shaft holding portion 22 of the housing 5. Three or more projections 25 are formed on an inner surface (surface opposed to the root portion 21) of the shaft holding portion 2 along a circumferential direction of the shaft holding portion 22. In FIG. 5, the projections 25 are formed over the entire circumference of the inner surface of the shaft holding portion 22.

The projections 25 project from the shaft holding portion 22 and abut against an outer surface of the root portion 21 of the shaft 3. By rotating the housing 5 from this abutment state, the projections 25 slide along the outer surface of the root portion 21 of the shaft 3. With this sliding motion of the projection 25, the housing 5 can rotate around the shaft 3 in a state where the housing 5 is supported by the root portion 21. Thus, the rotation of the housing 5 can stably be supported.

A contact area between the projection 25 and the root portion 21 is small, and a total contact area of all projections 25 is extremely small as compared with a case where the entire surface of the shaft holding portion 22 comes into contact with the root portion 21. According to this structure, the sliding resistance caused when the housing rotates become small, and the housing 5 can be rotated with a small force. Therefore, the output of the motor which rotates the housing 5 can be reduced, the rotating unit including the motor can be reduced in size, and the entire vehicle mirror apparatus can be reduced in size and weight.

Further, since the projections 25 stably support the rotation of the housing 5, it is unnecessary to increase the diameter of the root portion 21 of the shaft 3 more than necessary. Thus, adjustment of tie rotation support and the rotation force of the housing 5 can be simplified and thus, designing of the apparatus can be facilitated.

In this embodiment, a tip end of the projection 25 is rounded as shown in FIG. 6, and the rounded tip end abuts against the root portion 21. Since the rounded tip end of the projection 25 comes into contact with the root portion 21, the sliding resistance between the projection 25 and the root portion 21 is further reduced, and the output for rotating the housing can further be reduced.

Although the shaft holding portion 22 of the housing 5 is formed with the projections 25 in this embodiment, the same effect can be obtained even if the projections 25 are formed on the root portion 21 of the shaft 3 and brought into abutment against the shaft holding portion 22.

Figure 7:
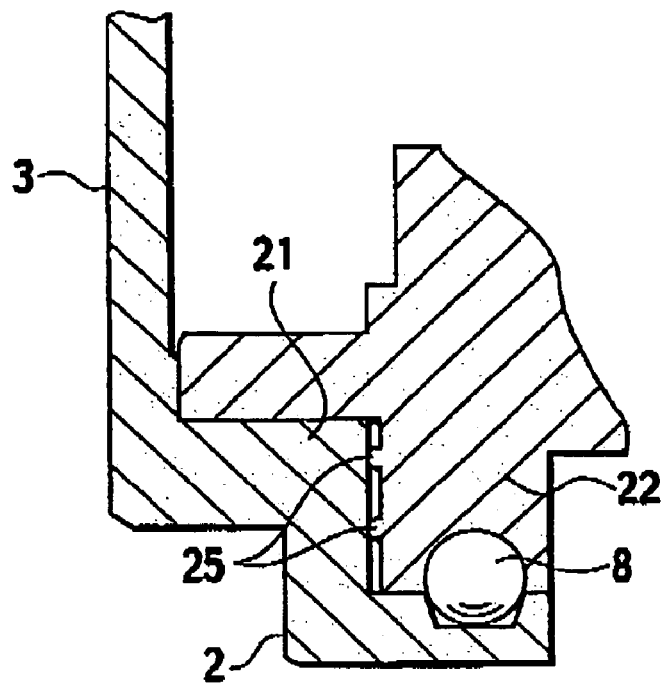
FIG. 7 is a sectional view of another embodiment of the present invention.
Figure 8:
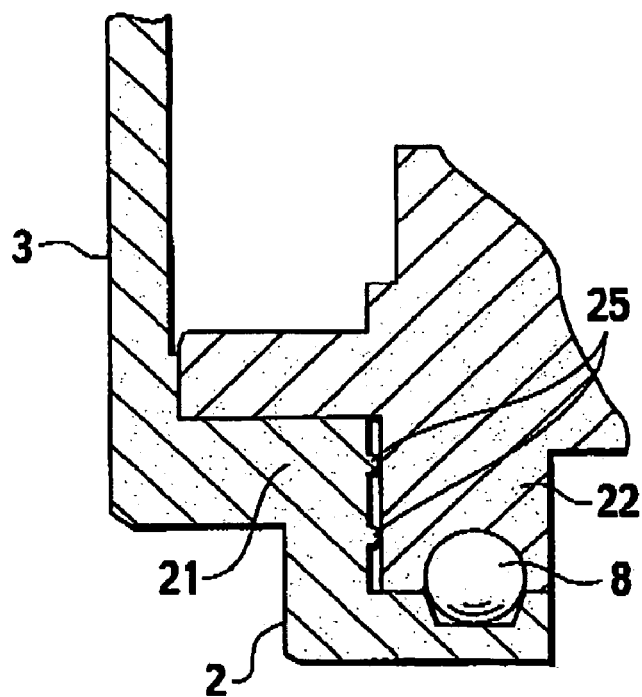
FIG. 8 is a sectional view of still another embodiment of the present invention.

FIGS. 7 and 8 show another embodiment of the invention. In the embodiment shown in FIG. 7, the projections 25 are formed on the shaft holding portion 22 of the housing 5 and abut against the root portion 21 of the shaft 3. In the embodiment shown in FIG. 8, the projections 25 are formed on the root portion 21 of the shaft 3 and abut against the shaft holding portion 22 of the housing 5.

In these embodiments, the projections 25 are formed annularly. That is, the projections 25 shown in FIG. 7 are formed over the entire length of the inner surface of the shaft holding portion 22 in the circumferential direction. The projections 25 shown in FIG. 8 are formed over the entire length of the outer surface of the root portion 21 of the shaft 3 in the circumferential direction. In FIGS. 7 and 8, the projections 25 are formed in upper and lower two rows.

According to such annular projections 25 also, if they abut against the mating member, the rotation of the housing 5 can be supported with small sliding resistance, but since the projections 25 are formed annularly, the projections 25 abut against the mating member over its entire circumference. Therefore, the projections 25 not only support the housing 5, but also prevent lubricant such as grease from leaking out from the housing 5, and the apparatus can be used safely.

In the embodiments shown in FIGS. 7 and 8 also, since tip ends of the projections 25 are rounded, the sliding resistance can further be reduced.

One embodiments of the present invention has been explained above, but the present invention is not limited thereto, and various changes are possible within the scope of the present invention.

The entire contents of Japanese Patent Application, No. P2004-007281 (filed on Jan. 14, 2004) are incorporated herein by reference.

What is claimed is:

1. A vehicle mirror apparatus comprising:
   a stationary side shaft holder having a shaft; and
   a housing that can rotate around the shaft, the shaft passing through the housing,
   wherein the housing has a shaft holding portion to which a root portion of the shaft is fitted;
   wherein the housing is rotatably supported by the shaft in a manner such that the shaft holding portion of the housing is rotated around the root portion of the shaft;
   wherein one of the shaft holding portion and the root portion of the shaft includes projections formed between a cylindrical inner surface of the shaft holding portion and a cylindrical outer surface of the root portion of the shaft;
   wherein the projections extend from one of the cylindrical inner surface of the shaft holding portion and the cylindrical outer surface of the root portion toward the other one of the cylindrical outer surface of the root portion and the cylindrical inner surface of the shaft holding portion so that tip ends of the projections abut against the other one of the cylindrical outer surface of the root portion and the cylindrical inner surface of the shaft holding portion; and
   wherein the tip ends of the projections circulate around the other one of the cylindrical outer surface of the root portion and the cylindrical inner surface of the shaft holding portion when the shaft holding portion of the housing is rotated around the root portion of the shaft, thereby reducing contact area between the cylindrical outer surface of the root portion and the cylindrical inner surface of the shaft holding portion through the projections so that frictional resistance therebetween is also reduced.

2. The vehicle mirror apparatus according to claim 1, wherein the tip ends of the projections are rounded.

3. The vehicle mirror apparatus according to claim 2, wherein the projections are formed on at least three locations along a circumferential direction of the shaft.

4. The vehicle mirror apparatus according to claim 2, wherein the projections are formed over an entire annular length in a circumferential direction of the shaft.

5. The vehicle mirror apparatus according to claim 1, wherein the projections are formed on at least three locations along a circumferential direction of the shaft.

6. The vehicle mirror apparatus according to claim 1, wherein the projections are formed over an entire annular length in a circumferential direction of the shaft.

* * * * *